Jan. 3, 1939.                J. M. VALLONE                 2,142,577
                          CONVERTIBLE BED COUCH
                          Filed June 19, 1937            4 Sheets-Sheet 1
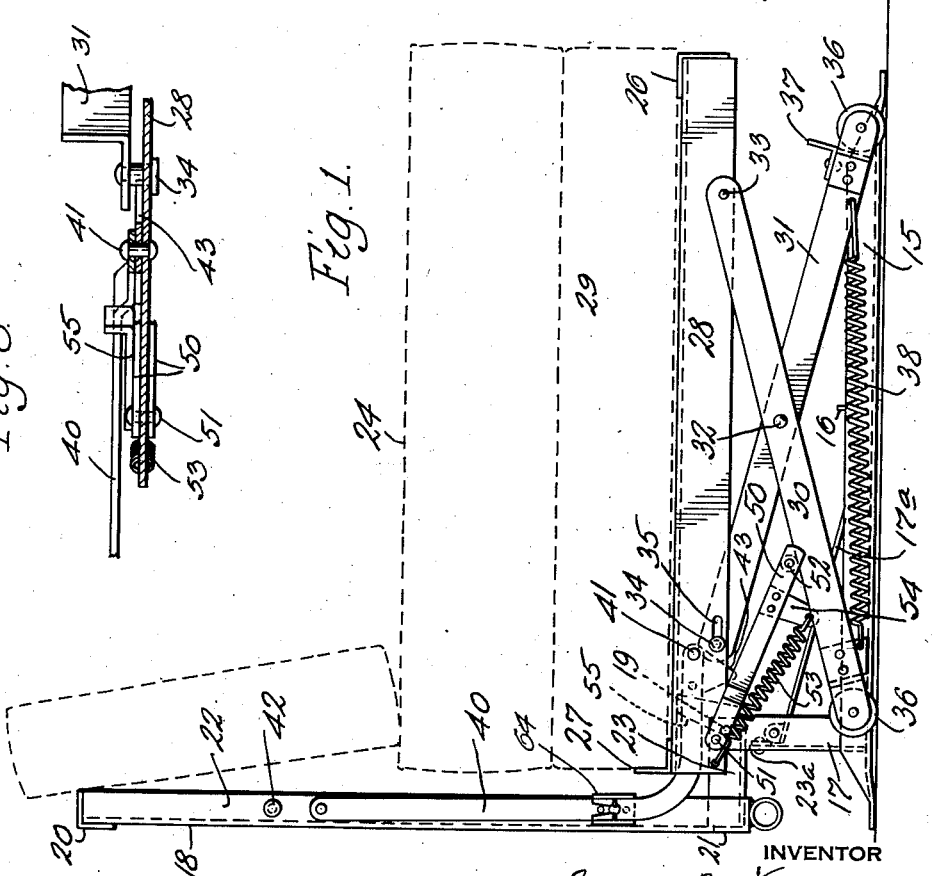
INVENTOR
Joseph M. Vallone
BY
Parker, Brochnow & Farmer.
ATTORNEYS

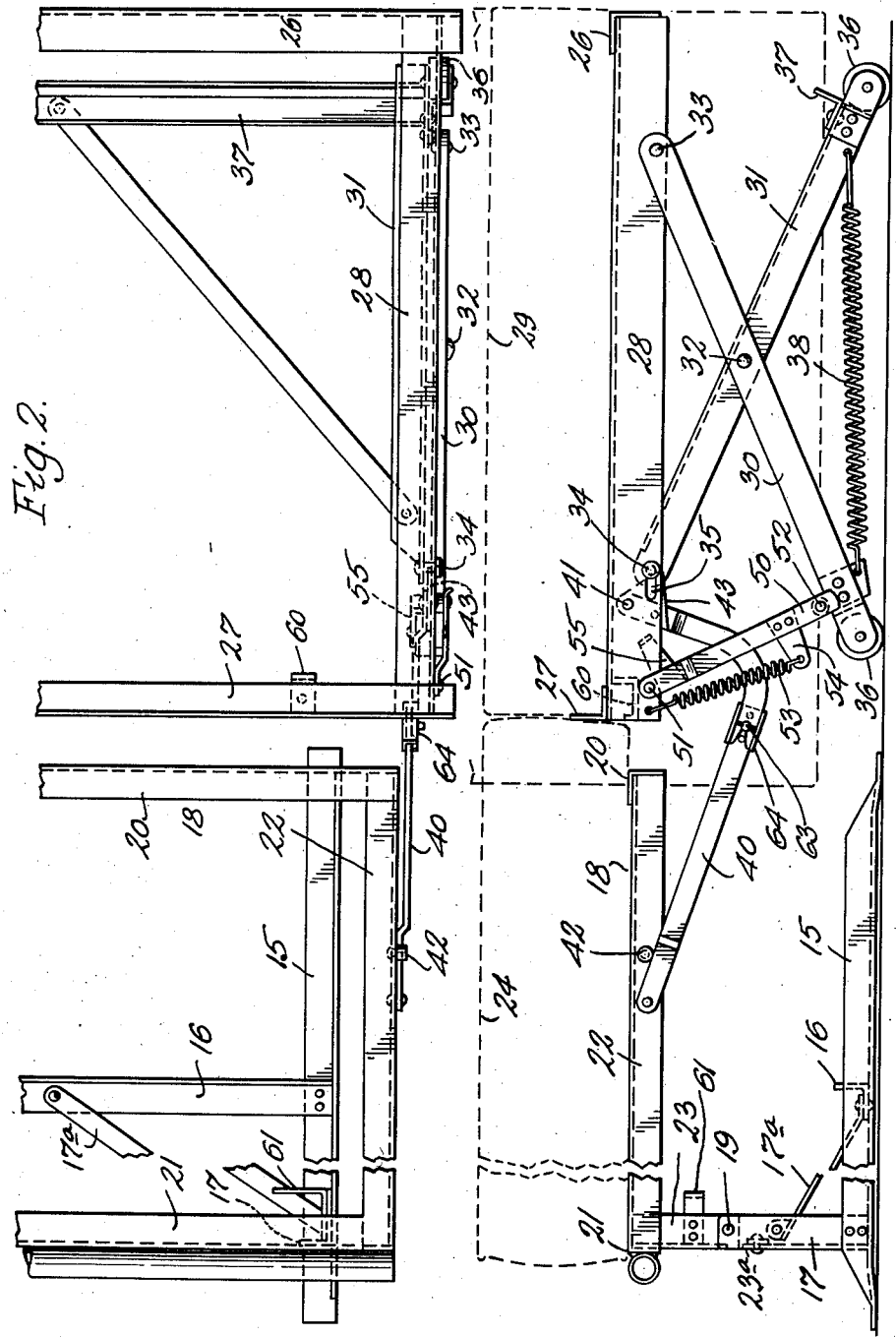

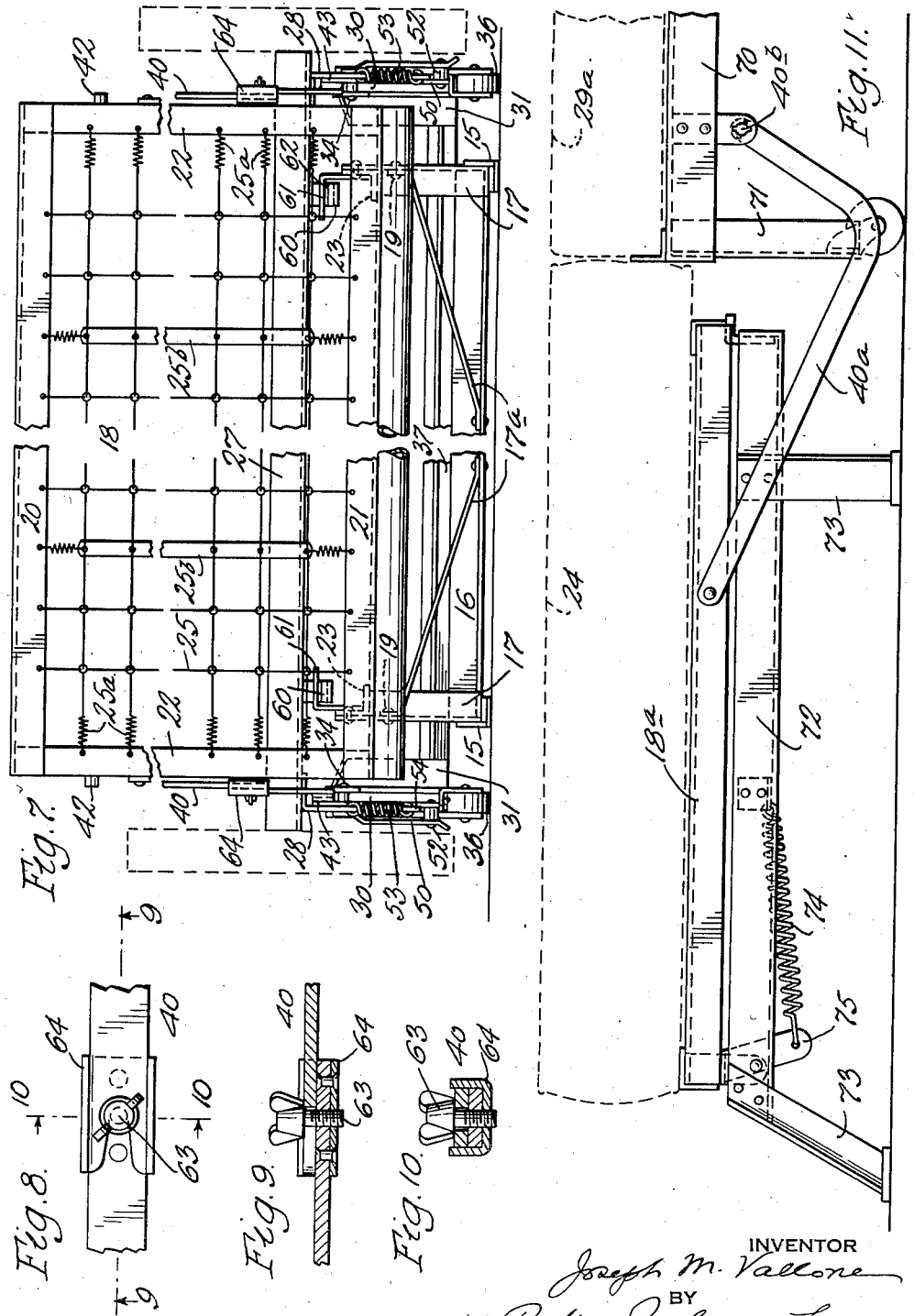

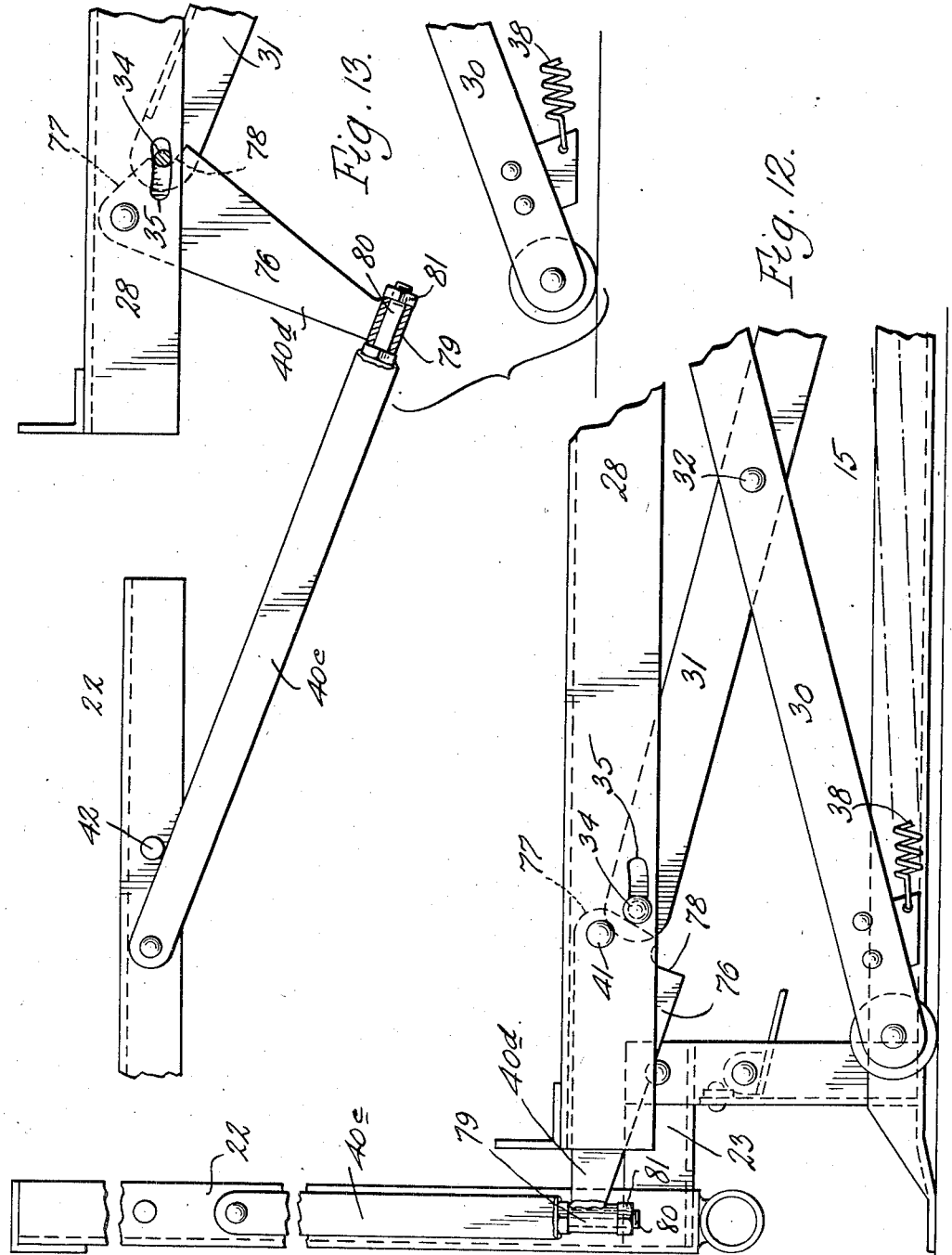

Patented Jan. 3, 1939

2,142,577

UNITED STATES PATENT OFFICE 2,142,577

CONVERTIBLE BED COUCH

Joseph M. Vallone, Buffalo, N. Y., assignor to Barcalo Manufacturing Company, Buffalo, N. Y.

Application June 19, 1937, Serial No. 149,158

10 Claims. (Cl. 5—44)

This invention relates to studio or convertible bed couches of that kind in which the couch back is adapted to be shifted from a normal standing position to provide a bed section in rear of the couch seat and cooperating therewith to form a wide bed.

The objects of the invention are to provide a desirable and easily operable, convertible bed couch of novel construction; to provide a convertible bed couch which is of new and improved construction; which is of simple and economical construction; in which the couch seat and back are supported by frames, one of which is movable forwardly and rearwardly relatively to the other to enable the back to be turned over to a horizontal position in rear of the seat to form the bed; in which the seat and back are firmly held in both the couch and bed-forming positions without the necessity for latching or holding means that have to be operated to permit conversion of the device from couch to bed or bed to couch; in which the seat section is raised and lowered respectively when converting from couch to bed and vice versa so that the couch seat will not be objectionably high nor the bed objectionably low; and which has the other features of advantage and improvement hereinafter described and set forth in the claims.

The accompanying drawings illustrate three different embodiments of the invention. In said drawings:

Fig. 1 is an end elevation of a couch of one construction embodying the invention, the parts being shown in normal couch position and the upright couch ends, which are provided at opposite ends of the couch seat being omitted to better show the other parts.

Fig. 2 is a fragmentary, plan view thereof with the parts in bed-forming position.

Fig. 3 is an end elevation of the parts shown in Fig. 2.

Fig. 4 is an enlarged fragmentary end elevation partly in section, of the portions of the seat-supporting and back frames adjacent their hinge connection, and associated parts.

Fig. 5 is a similar partial view showing the position of the parts when converted into a bed.

Fig. 6 is a sectional plan on the plane of line 6—6, Fig. 5.

Fig. 7 is a rear elevation, partly broken away, of the couch.

Fig. 8 is an enlarged elevation of the connection for the two sections of the operating link between the back and seat frame.

Figs. 9 and 10 are different sections thereof on lines 9—9 and 10—10 respectively, Fig. 8.

Fig. 11 is a fragmentary end elevation of a modification of the invention, showing the bed-forming position of the parts.

Fig. 12 is a fragmentary end elevation similar to Fig. 1, but showing a somewhat modified construction.

Fig. 13 is a fragmentary end elevation of some of the parts thereof, but showing them in their bed-forming positions.

The couch comprises a seat-supporting frame and a back-supporting frame, one of which is movable forwardly and rearwardly relative to the other for converting from couch to bed and vice versa, and a back frame or section which is hinged on the back-supporting frame to swing down from a normal standing position to a horizontal position in rear of the couch seat, with which it cooperates to form the bed. Preferably the back-supporting frame remains stationary while the seat-supporting frame is movable forwardly and rearwardly relatively thereto.

Referring first to the embodiment of the invention shown in Figs. 1-10, the stationary frame, as shown, comprises transverse horizontal base bars 15 which are rigidly connected by a longitudinal bar 16, and consist of metal angle bars having the end portions of their horizontal flanges offset downwardly to form supporting feet. Vertical legs or posts 17 are rigidly secured to and project upwardly from the rear end portions of the base bars, and the back frame or section 18 of the couch is suitably hinged, as by pivots 19, to the upper ends of the legs 17 so that the back frame is adapted to swing down forwardly from its normal standing position, shown in Fig. 1 to a horizontal position over its supporting frame. The legs 17 may be metal angle bars and may be braced by inclined bars 17a extending therefrom to the base bar 16 and riveted to the legs and base bar. The back frame shown comprises upper and lower side metal angle bars 20 and 21, and end angle bars 22 rigidly secured to and connecting the side bars at their ends. Angle bar leg sections 23 rigidly secured to and projecting at right angles from the lower corners of the back frame are hinged by the pivots 19 to the stationary legs 17. In the standing position of the back frame, the leg sections 23 extend rearwardly from the hinge joints 19 thus locating the back frame to the rear of the stationary legs, and in the horizontal position of the back frame the leg sections 23 extend downwardly therefrom to their hinge connections with the legs 17. This arrangement enables the use of a back frame which, when turned down, provides a wide rear bed section without having the couch back of objectionable height. By removing the upper parts of the rear flanges of the legs 17, shoulders 23a are formed adapted to engage the leg sections 23 to prevent the back from swinging backwardly beyond its desired upright position.

In the embodiment of the invention shown, the couch is furnished with one or more removable back cushions and with a removable seat cushion 24 which is used to form the rear mattress section for the bed. The back frame shown is therefore made with a flexible cushion support 25 which may consist of a wire mesh or link fabric stretched between and resiliently connected to the end bars of the back frame by coil springs 25a and yieldingly supported between its ends by flexible bands 25b attached by springs to the side bars of the frame. When the back is turned down, this elastic support 25 forms a spring bed bottom adapted to support the rear mattress section, formed by the removable cushion 24.

The seat-supporting frame shown comprises front and rear horizontal metal angle bars 26 and 27 rigidly connected at their ends by transverse horizontal angle bars 28, and legs at opposite ends of the frame which straddle the back-supporting frame and support the couch seat from the floor. As shown, the seat-supporting frame is upholstered to form a spring cushioned couch seat 29, indicated by broken lines, which may be of ordinary construction comprising coil springs supported by the seat frame and supporting a covered seat pad or cushion. However, the seat cushion also could be a detached removable cushion instead of being made on the frame as explained.

The legs for the seat frame preferably consist of a pair of inclined leg bars 30 and 31 at each end of the frame crossing and pivotally connected to each other at 32 with the upper end of the rear leg 30 pivoted at 33 to the adjacent frame end bar 28, and the upper end of the front leg 31 pivotally and slidably connected to the frame bar 28, as by a headed stud 34 fixed to the leg and slidably engaging in a horizontally elongated slot 35 in the frame bar 28. Each leg preferably is provided at its lower end with a roller or caster 36 to bear and roll on the floor. The lower ends of the front leg 31 at opposite ends of the frame are rigidly connected by a horizontal longitudinal angle bar 37. Preferably the front legs are formed by angle bars and the rear legs by plain flat bars. The sliding pivotal connection of one leg of each pair to the frame bar permits limited swinging movements of the cross legs on the connecting pivot 32 with an accompanying raising or lowering of the seat-supporting frame for locating the couch seat in normal low position and for raising the frame to locate it at a higher level when forming the front section of the bed. An extensible coil spring 38 attached at its ends to the lower ends of the legs 30 and 31 of each pair, tends to draw the lower ends of the legs together and assist in elevating the seat frame. In the normal position of the couch seat, the weight of the seat frame and seat and cushion 24 is sufficient to stretch the springs 38 and permit the couch seat to occupy the lower position, but in converting from couch to bed, the springs assist in lifting the weight of the seat and frame.

At each end of the couch is a link 40 which is suitably pivoted at its front end at 41 to the adjacent end bar of the seat frame, and at its opposite end to the adjacent end bar 22 of the back frame, between the upper and lower ends thereof. These links are bent or have their opposite ends extending at substantially right angles to each other and so proportioned that when the back frame is in its normal standing position, the links will extend downwardly from their connections with the back frame substantially parallel with and beside the end bars of the back frame and then under the couch seat substantially parallel with and beside the end bars of the seat frame to their connections with the seat frame. In the normal positions of couch seat and back the links will thus be hidden from sight between the couch back and seat and the upright couch ends with which the couch is provided at opposite ends of the seat frame, but which are omitted from the drawings to better show the construction and arrangement of the frames, links and other parts. When the couch back is swung downwardly and forwardly to convert from couch to bed, the links 40 push the seat-supporting frame forwardly and permit the couch back to move down in rear of the couch seat until arrested by engagement of rigid studs or projections 42 on the end bars of the back frame with the long arms of the links and thus support the back in the horizontal position in rear of the couch seat as shown in Fig. 3.

Fixed to or rigid with each link 40 adjacent its lower or front end is a cam plate or projection 43 which, when the couch back is swung downwardly, to convert from couch to bed, engages the pivots 34 at the upper ends of the front legs of the seat frame and shoves these pivots forwardly in their slots 35, thereby raising the seat frame from its lower to its raised position. The springs 38 assist in this movement of the legs, and thus make it easier to convert the couch into the bed.

For the purpose of supporting the seat frame rigidly in its raised position, a prop 50 is provided at each end of the seat frame. This prop, as shown, consists of two bars pivoted at their upper ends by a pivot 51 to the rear end of the adjacent end frame bar 28 and connected and spaced apart at their lower ends by a rivet or pin 52 which is adapted to engage and slide along the upper edge of the adjacent rear leg 30 of the seat frame. A spring 53 attached at one end to the rear corner portion of the seat frame and at its other end to a rigid bracket or part 54 projecting rearwardly from the free end portion of the prop, tends to swing the prop rearwardly to the position shown in Fig. 3 in which the prop is substantially perpendicular to the leg 30 when the seat is in its elevated position, and thus prevents the movement of the seat frame and lower ends of the legs toward each other, necessary to lower the seat, whereby the seat is rigidly supported in the elevated bed-forming position of the couch seat.

In order to shift the prop 50 out of this seat-supporting position when swinging the back frame upwardly to convert from bed to couch, each prop is provided adjacent its pivot end with a fixed arm 55, the outer end of which extends laterally into the plane of movement of the adjacent link 40, so that as the back frame is raised and the seat frame drawn rearwardly, the link will strike the lateral extension of the arm 55 and swing the lower end of the prop forwardly against the action of its spring 53, thus moving the prop out of its perpendicular supporting position and permitting the pin 52 at its lower end to ride up along the edge of the leg 30 and thus allow the seat frame to descend to its lower position.

The seat frame of the couch is thus moved forwardly or rearwardly and raised or lowered in converting from couch to bed or from bed to couch simply by pressing the upper edge of the back frame downwardly or lifting it upwardly and there are no latching or holding means which need be first released to permit the movement of the parts to convert from couch to bed or bed to couch.

Connections are preferably provided between the seat and back-supporting frames, whereby the latter will be lifted with the former, if it is attempted to lift or move the couch by lifting on the seat frame or the couch ends (not shown) which are secured to the seat frame at its opposite ends. These connections, as shown, comprise hooks 60 fixed on the under side of the rear bar 27 of the seat frame, one near each end thereof, and adapted to hook under brackets 61 fixed to and projecting inwardly from the leg section 23 of the back (see Fig. 4) when the seat frame is moved rearwardly to its normal position in converting the bed into the couch. If the seat frame is lifted when in its normal position the hooks 60 will engage the brackets 61 and lift the rear end of the back-supporting frame, and since the shoulders 23a of the legs 17 limit rearward swinging movement of the legs relatively to the leg sections 23, the back-supporting frame will be lifted bodily with the seat frame. Upward projections 62 at the ends of the hooks 60 prevent possible accidental disengagement of the hooks from the brackets 61. In the normal position of the parts of the couch the front ends of the base bars 15 extend under the connecting bar 37 for the front legs and thus prevent the back-supporting frame from being tilted backwardly by leaning or pressing rearwardly against the couch back.

Preferably each of the operating links 40 which connect the back to the seat frame is made in two sections which, as best shown in Figs. 8–10, may be detachably connected together as by a thumb screw 63 passing through an open-ended slot in the end of one section and screwed into a threaded hole in the other section. A clip 64 fixed on one link section and having side flanges straddling the other section hold the sections rigid with each other. This separable sectional construction of the links 40 permits ready connection and disconnection of the seat and back-supporting frames to and from each other, and thus facilitates the construction and assembly of the couch and the separation of the seat and back sections when desired for shipping or other reasons. The link sections could be separately but rigidly connected in any other suitable way.

In the modified embodiment of the invention illustrated in Fig. 11, the back 18a is hinged to a supporting frame and connected by links 40a to the seat supporting frame, as before explained, so that by swinging the back down forwardly, the seat is moved forward to allow the back to lie horizontally in rear of the seat for forming the bed, and by returning the back to its normal standing position the seat is moved rearwardly over the back-supporting frame. Also the links 40a are bent so as to be hidden from view between the couch ends and the ends of the couch back and seat in the normal positions of the parts, as before explained. But this modified construction is a simpler and less expensive construction in which the couch seat is not raised and lowered in converting from couch to bed and vice versa.

Instead the supporting frame 70 for the couch seat 29a may be a rigid rectangular frame with fixed legs 71 at the corners equipped with casters or rollers to roll on the floor. The back-supporting frame also may be a rigid rectangular frame 72 with fixed corner legs 73. A spring 74 is shown attached to the frame 72 and to a fixed arm 75 on the couch back at its lower or rear portion for assisting in lifting the back and drawing the seat frame rearwardly when converting from bed to couch. One or more such springs may be employed as may be necessary.

The links 40a of this modification can, if desired, be made of separable sections detachably connected, as in the case of the links 40 of the first construction or, if desired, the links 40a may be pivoted to the seat frame by detachable pivot connections 40b of any suitable sort.

Figs. 12 and 13 illustrate a modification of the construction first described and shown in Figs. 1–7, by which the separate prop or device shown in said first construction, for securing the seat in its raised position, is rendered unnecessary. This Fig. 12–13 construction may be the same as first described, except as follows: Each of the operating links between the seat and back frame comprises a section 40c pivoted to the back frame 22 and a rigidly attached section 40d in the form of a cam plate 76, which is pivoted to the seat frame and has a cam edge 77 and locking shoulder 78 arranged to engage the stud 34 which slidably connects the adjacent front leg 31 to the seat frame 28. When converting the couch into the bed, the cam edge 77 shoves the stud 34 forwardly in its slot 35 in the seat frame, thereby raising the seat until the locking shoulder 78 slips behind the stud 34 and locks the seat in its elevated position. In order to reconvert the bed into the couch, it is only necessary to swing the back section upwardly and rearwardly, as in the first construction, which restores the parts to their normal couch-forming positions, as first explained. The cam plate 76 may be removably attached rigidly to the link section 40c by forming the cam plate with a socket 79 which is sleeved on a fixed stud 80 at the end of the link section 40c and is secured thereon by a nut 81 screwed on the threaded end of the stud. This enables disconnection of the link sections for separating the seat and back sections of the couch.

I claim as my invention:

1. A convertible bed couch comprising a seat-supporting frame with a seat, and a back-supporting frame, one of which frames is movable horizontally in and out from a position forwardly of the other, said seat-supporting frame having supporting legs which straddle said back-supporting frame, a back frame hinged to the back supporting frame to swing from a standing position to a horizontal position in rear of said seat, links pivoted to the ends of said back frame and seat-supporting frame and causing said relative in and out movements of said seat and back supporting frames to accompany up and down swinging of said back frame, each link being disposed between the vertical planes of the adjacent ends of the back frame and seat-supporting frame and having angularly disposed portions arranged to extend respectively substantially in the planes of said back frame and seat when the back frame is in its standing position, and projections on the ends of said back frame adapted to engage said links for supporting said back frame in a horizontal position.

2. A convertible bed couch comprising a seat-supporting frame with a seat, and a back supporting frame, one of which frames is movable horizontally in and out from a position forwardly of the other, a back frame hinged to the back-supporting frame to swing from a standing position to a horizontal position in rear of said seat, a link pivoted to said back frame and to said seat-supporting frame, whereby upward and downward swinging movement of the back frame causes said in and out relative movements of said seat and back-supporting frames, and elevating mechanism acting by the out and in relative movements of the seat and back-supporting frames to respectively elevate and lower said seat.

3. A convertible bed couch comprising a seat-supporting frame with a seat, and a back-supporting frame, one of which frames is movable horizontally in and out from a position forwardly of the other, a back frame hinged to the back-supporting frame to swing from a standing position to a horizontal position in rear of said seat, a link pivoted to said back frame and to said seat-supporting frame, whereby upward and downward swinging movement of the back frame causes said in and out relative movements of said seat and back-supporting frames, said link having angularly disposed portions arranged to extend substantially parallel with the ends of said back frame and seat frame respectively when said back frame is in its standing position, said seat-supporting frame having supporting legs movable for elevating and lowering said seat, and means operated by said links for moving said legs to elevate and lower said seat respectively during the out and in movements of said seat and back-supporting frames.

4. A convertible bed couch comprising a seat-supporting frame with a seat, and a back-supporting frame, one of which frames is movable horizontally in and out from a position forwardly relatively to the other, a back frame hinged to the back supporting frame to swing from a standing position to a horizontal position in rear of said seat, a link pivoted to said back frame and to said seat-supporting frame, whereby upward and downward swinging movement of the back frame causes said in and out relative movements of said seat and back supporting frames, elevating mechanism acting by the out and in relative movements of the seat and back-supporting frames to respectively elevate and lower said seat, and a device cooperating with said elevating mechanism for securing said seat in its elevated position.

5. A convertible bed couch comprising a seat-supporting frame with a seat, and a back-supporting frame, one of which frames is movable horizontally in and out from a position forwardly of the other, a back frame hinged to the back-supporting frame to swing from a standing position to a horizontal position in rear of said seat, a link pivoted to said back frame and to said seat-supporting frame, whereby upward and downward swinging movement of the back frame causes said in and out relative movements of said seat and back supporting frames, said seat-supporting frame having supporting legs movable for elevating and lowering said seat, means operated by said link for moving said legs to elevate and lower said frame respectively during the out and in relative movements of said seat and back-supporting frames, and a device cooperating with said legs for securing said seat in its elevated position.

6. A convertible bed couch comprising a back-supporting frame, a seat-supporting frame with a seat movable forwardly and rearwardly from a position in which the seat overlies the back-supporting frame, a back frame hinged adjacent one edge to the rear portion of said back-supporting frame, a link pivoted to said back frame and seat-supporting frame for moving said seat-supporting frame in and out when said back frame is swung up and down, pivoted crossed legs for said seat-supporting frame movably connected to said frame, and means operating between said link and legs for moving the legs to elevate and lower the seat-supporting frame when it is moved out and in.

7. A convertible bed couch comprising a back-supporting frame, a seat-supporting frame with a seat movable forwardly and rearwardly from a position in which the seat overlies the back-supporting frame, a back frame hinged adjacent one edge to the rear portion of said back-supporting frame, a link pivoted to said back frame and seat-supporting frame for moving said seat-supporting frame in and out when said back frame is swung up and down, pivoted crossed legs for said seat-supporting frame movably connected to said frame, means operating between said link and legs for moving the legs to elevate and lower the seat-supporting frame when it is moved out and in, and a spring actuated prop connected to said seat-supporting frame and engaging one of said legs for securing said seat-supporting frame in its elevated position.

8. A convertible bed couch comprising a back-supporting frame, a seat-supporting frame with a seat movable forwardly and rearwardly from a position in which the seat overlies the back-supporting frame, a back frame hinged adjacent one edge to the rear portion of said back-supporting frame, a link pivoted to said back frame and seat-supporting frame for moving said seat-supporting frame in and out when said back frame is swung up and down, pivoted crossed legs for said seat-supporting frame movably connected to said frame, means operating between said link and legs for moving the legs to elevate and lower the seat-supporting frame when it is moved out and in, a spring actuated prop connected to said seat-supporting frame and engaging one of said legs for securing said seat-supporting frame in its elevated position, and a part connected to said prop arranged to be engaged by said link for shifting said prop to permit movement of said legs for lowering the seat-supporting frame when the latter moves inwardly.

9. A convertible bed couch comprising a seat-supporting frame with a seat, and a back-supporting frame, one of which frames is movable horizontally out and in from a position in which the seat overlies the back-supporting frame, a back frame hinged to the back-supporting frame to swing from a standing position to a horizontal position in rear of said seat, a link pivoted to said back frame and to said seat-supporting frame, whereby upward and downward swinging movement of the back frame causes said in and out relative movements of said seat and back-supporting frames, frame supports movable for elevating and lowering said seat-supporting frame, and means operated by said link for moving said supports to elevate said seat during the relative out movement of said seat and back-supporting frames and also for securing the seat in its elevated position.

10. A convertible bed couch comprising a seat-supporting frame with a seat, and a back supporting frame, one of which frames is movable horizontally in and out from a position forwardly of the other, a back frame hinged to the back-supporting frame to swing from a standing position to a horizontal position in rear of said seat, a link pivoted to said back frame and to said seat-supporting frame, whereby upward and downward swinging movement of the back frame causes said in and out relative movements of said seat and back supporting frames, frame supports movable for elevating and lowering said seat-supporting frame, and a cam on said link which moves said supports to elevate said seat during the relative out movement of the seat and back-supporting frames and also releasably secures the seat in its elevated position.

JOSEPH M. VALLONE.